United States Patent
Joy et al.

(10) Patent No.: US 11,528,293 B2
(45) Date of Patent: *Dec. 13, 2022

(54) ROUTING BASED ON A VULNERABILITY IN A PROCESSING NODE

(71) Applicant: Oracle International Corporation, Redwood Shores, CA (US)

(72) Inventors: Ajai Joy, Tyngsboro, MA (US); Sarat Aramandla, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/936,427

(22) Filed: Jul. 23, 2020

(65) Prior Publication Data

US 2020/0358809 A1    Nov. 12, 2020

Related U.S. Application Data

(63) Continuation of application No. 15/466,632, filed on Mar. 22, 2017, now Pat. No. 10,785,248.

(51) Int. Cl.
*H04L 9/40* (2022.01)
*G06F 9/50* (2006.01)

(52) U.S. Cl.
CPC ........ *H04L 63/1433* (2013.01); *G06F 9/5044* (2013.01); *G06F 9/5083* (2013.01); *H04L 63/1441* (2013.01)

(58) Field of Classification Search
CPC ............. H04L 63/1433; H04L 63/1441; G06F 9/5044; G06F 9/5083
USPC .......................................................... 726/25
See application file for complete search history.

(56) References Cited

U.S. PATENT DOCUMENTS

| | | | |
|---|---|---|---|
| 9,160,630 B2 | 10/2015 | Wong et al. | |
| 9,930,012 B1 | 3/2018 | Clemons et al. | |
| 2009/0276853 A1 | 11/2009 | Govindavajhala | |
| 2010/0100962 A1* | 4/2010 | Boren | H04L 63/1433 726/25 |
| 2013/0021962 A1 | 1/2013 | Hu et al. | |
| 2013/0086688 A1* | 4/2013 | Patel | H04L 63/168 726/25 |
| 2013/0305356 A1 | 11/2013 | Cohen-Ganor et al. | |
| 2014/0096256 A1 | 4/2014 | Clark et al. | |
| 2014/0189873 A1 | 7/2014 | Elder et al. | |
| 2015/0033340 A1 | 1/2015 | Giokas | |

(Continued)

*Primary Examiner* — Shewaye Gelagay
*Assistant Examiner* — Moeen Khan
(74) *Attorney, Agent, or Firm* — Invoke

(57) ABSTRACT

Techniques for routing a request based on a vulnerability in a processing node are disclosed. A vulnerability analyzer determines a set of detected vulnerabilities in each of a set of processing nodes. Based on the detected vulnerabilities, the vulnerability analyzer determines a respective vulnerability score for each processing node. A routing engine receives a request to be processed by at least one of the set of processing nodes. The routing engine selects a particular node for processing the request based on the detected vulnerabilities in one or more of the set of processing nodes. The routing engine may select the particular node based on the vulnerability scores of the set of processing nodes. Additionally or alternatively, the routing engine may select the particular node based on whether the particular node includes any vulnerability that may be exploited by the request.

36 Claims, 6 Drawing Sheets

(56) References Cited

U.S. PATENT DOCUMENTS

| | | |
|---|---|---|
| 2017/0046519 A1* | 2/2017 | Cam ...................... G06N 7/005 |
| 2017/0078320 A1 | 3/2017 | Hughes |
| 2017/0244737 A1* | 8/2017 | Kuperman ............... G06N 3/04 |
| 2017/0289187 A1 | 10/2017 | Noel et al. |
| 2018/0084000 A1 | 3/2018 | Baukes et al. |
| 2018/0124092 A1* | 5/2018 | Pope ................... H04L 63/1433 |

\* cited by examiner

ROUTING BASED ON A VULNERABILITY IN A PROCESSING NODE

INCORPORATION BY REFERENCE; DISCLAIMER

The following application is hereby incorporated by reference: application Ser. No. 15/466,632 filed on Mar. 22, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to routing requests to processing nodes. In particular, the present disclosure relates to routing based on a vulnerability in a processing node.

BACKGROUND

In a computer system, workload may be divided across multiple processing nodes. A processing node may be, for example, a computer, a computer cluster, a network link, a central processing unit, a disk drive, a virtual machine, an application, and/or a database. Using multiple processing nodes to process the workload may optimize resource usage, maximize throughput, minimize response time, avoid overloading of any single node, and/or increase reliability. The traffic may be divided at any layer of the Open Systems Interconnection (OSI) model, such as the data link layer (Layer 2), the network layer (Layer 3), and/or the transport layer (Layer 4). A particular processing node (such as, a server) may be used to distribute the workload across the processing nodes that are providing a particular service.

As an example, a single Internet service (such as, a web site) may be provided by multiple servers, also known as a server farm. The multiple servers operate concurrently to serve concurrent requests being made to the Internet service. A dedicated server may be used to distribute the requests to the servers providing the Internet service.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
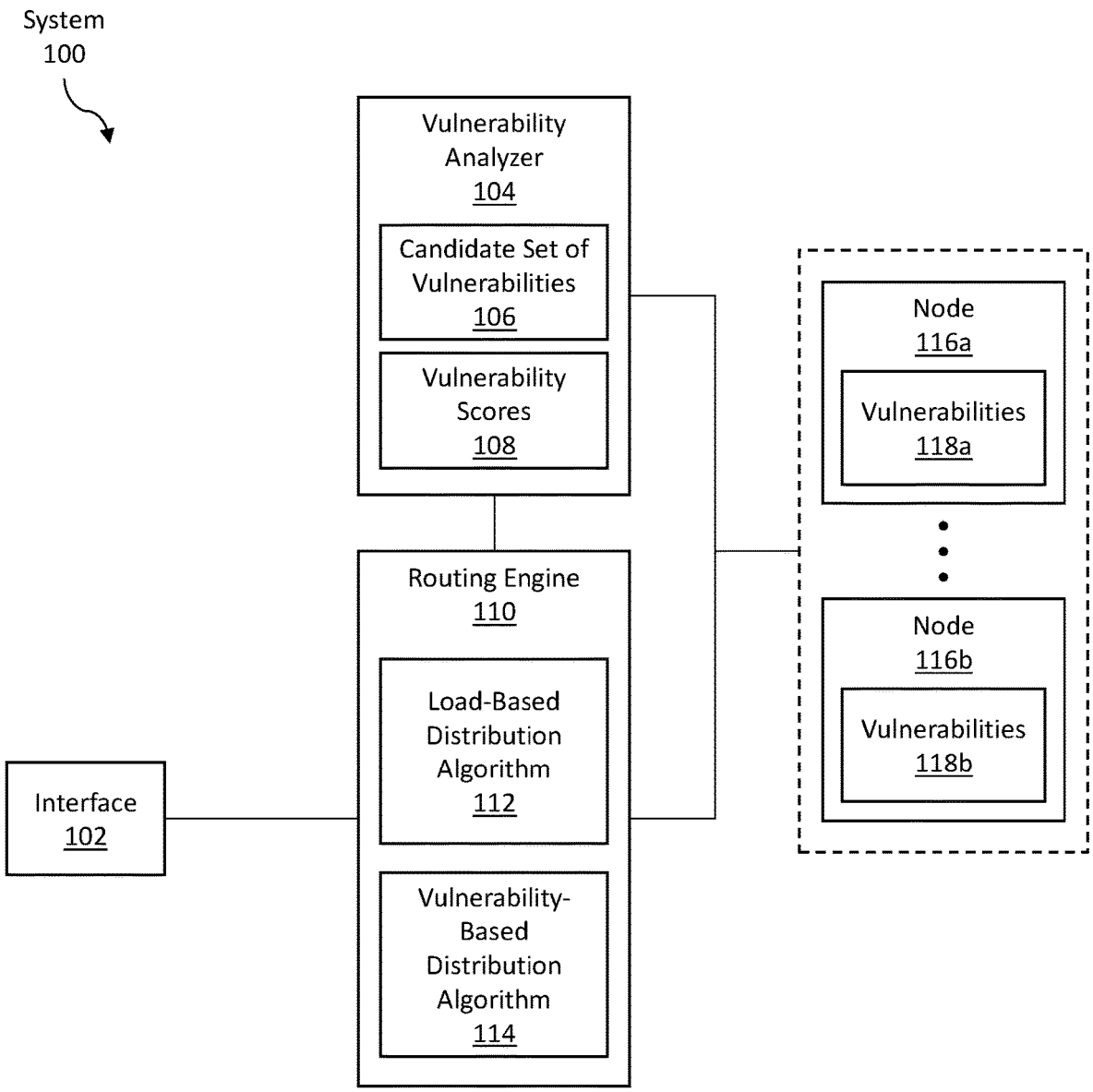
FIG. 1 illustrates a routing system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ROUTING SYSTEM ARCHITECTURE
3. DETERMINING A VULNERABILITY OF A PROCESSING NODE
4. ROUTING A REQUEST BASED ON A VULNERABILITY OF A PROCESSING NODE
5. EXAMPLE EMBODIMENTS
6. MISCELLANEOUS; EXTENSIONS
7. HARDWARE OVERVIEW

1. General Overview

One or more embodiments include routing a request to one of a set of processing nodes, based on a vulnerability of a processing node. The term "vulnerability," as used herein, means a weakness in the computational logic found in software and/or hardware components (such as, firmware) that, when exploited, results in a negative impact to confidentiality, integrity, and/or availability of a computer system and/or network. Mitigation of a vulnerability typically involves coding changes, but could also include specification changes or even specification deprecations (such as, removing an affected protocol and/or functionality in its entirety). Additionally or alternatively, the term "vulnerability" covers a system configuration issue or a mistake in software that allows access to information or capabilities that can be used by a hacker as a stepping-stone into a computer system and/or network. The system configuration issue or mistake in software may: allow an attacker to conduct information gathering activities; allow an attacker to hide activities; include a capability that behaves as expected, but can be easily compromised; include a primary point of entry that an attacker may attempt to use to gain access to the system or data; and/or be considered a problem according to a reasonable security policy.

In one or more embodiments, a vulnerability analyzer analyzes each of a set of processing nodes. The vulnerability analyzer determines a set of detected vulnerabilities for each processing node. The vulnerability analyzer determines a vulnerability score for each processing node based on the corresponding set of detected vulnerabilities. A routing engine obtains a request to be processed by one of the processing nodes. The routing engine selects one of the set of processing nodes based on a vulnerability score of one or more processing nodes. The routing engine routes the request to the selected processing node. As an example, a routing engine may route a request to one of a set of processing nodes that is associated with the lowest vulnerability score.

In one or more embodiments, a vulnerability analyzer analyzes each of a set of processing nodes. The vulnerability analyzer determines a set of detected vulnerabilities for each processing node. A routing engine obtains a particular request to be processed by one of the processing nodes. The routing engine identifies a subset of processing nodes that do not include a vulnerability that may be exploited by the particular request. The routing engine routes the particular request to one of the subset of processing nodes.

As an example, some vulnerabilities may be exploited only by requests of a certain protocol. A vulnerability analyzer may determine that a particular processing node includes only a vulnerability that may be exploited by requests adhering to the User Data Protocol (UDP). A routing engine may obtain a request that adheres to the Transport Control Protocol (TCP), rather than UDP. The routing engine may route the request to the particular processing node.

Under normal circumstances, a computer system may perform routing of requests to a set of processing nodes to achieve the balancing of loads across the processing nodes. However, if and when there is a concern about a vulnerability in a computer system, or a concern about a potential outbreak or attack on a computer system, then the primary concern becomes preventing an exploitation of the vulnerability. Routing may be performed, at least in part, to avoid processing nodes that are a greater risk of being exploited.

One or more embodiments described in this Specification and/or recited in the claims may not be included in this General Overview section.

2. Routing System Architecture

FIG. 1 illustrates a routing system, in accordance with one or more embodiments. As illustrated in FIG. 1, a system 100 includes an interface 102, a vulnerability analyzer 104, a routing engine 110, and one or more processing nodes 116a-b. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a processing node (such as processing node 116a or processing node 116b) refers to hardware and/or software configured to provide a service, perform an operation, and/or execute an application. Examples of a processing node include a computer, a computer cluster, a network link, a central processing unit, a disk drive, a virtual machine, an application, and a database.

A system 100 includes multiple processing nodes 116a-b. Workload is divided across the multiple processing nodes 116a-b. The traffic may be divided at any layer of the Open Systems Interconnection (OSI) model, such as the data link layer (Layer 2), the network layer (Layer 3), and/or the transport layer (Layer 4). As an example, a set of servers in a server farm may serve the same website. Requests for the website, from different clients, may be divided across the set of servers. Each server may serve a different subset of the requests for the same website.

Each processing node is associated with zero, one, or more vulnerabilities. As illustrated, for example, node 116a is associated with vulnerabilities 118a. Node 116b is associated with vulnerabilities 118b.

In one or more embodiments, an interface 102 refers to hardware and/or software configured to receive a request to be processed by at least one of the processing nodes 116a-b. Examples of an interface include a user interface, a graphical user interface, a command line interface, a voice interface, and/or an application programming interface (API).

In one or more embodiments, a vulnerability analyzer 104 refers to hardware and/or software configured to determine one or more vulnerabilities (such as, vulnerabilities 118a or vulnerabilities 118b) included in a processing node. Examples of operations for determining a vulnerability of a processing node are described below with reference to FIG. 2.

A vulnerability analyzer 104 may store a candidate set of vulnerabilities 106. A candidate set of vulnerabilities 106 is vulnerabilities that may potentially exist in a processing node. A candidate set of vulnerabilities 106 may be obtained from, and/or updated based on, one or more databases of known vulnerabilities that are maintained by the government and/or various organizations. Examples of a vulnerability database include the National Vulnerability Database (NVD) (maintained by the National Institute of Standards and Technology), and the Common Vulnerabilities and Exposures (CVE) List. Each entry in a vulnerability database may be associated with an identifier (ID), and a description. A description may include details such as the name of the affected product and vendor, a summary of affected versions, the vulnerability type, the impact, the access that an attacker requires to exploit the vulnerability, and/or the important code components or inputs that are involved. The description may also include a risk, an impact, a severity score, an impact rating, fix information, and/or detailed technical information.

A vulnerability analyzer 104 may determine vulnerability scores 108 for the processing nodes 116a-b. A vulnerability score 108 is a measure associated with the vulnerabilities included in a processing node. As an example, a vulnerability score may be a total number of vulnerabilities detected in a processing node. As another example, a vulnerability score may be a weighted sum corresponding to the vulnerabilities detected in a processing node, wherein the weights are determined based on the severity of the vulnerabilities, the impact of the vulnerabilities, and/or other attributes associated with the vulnerabilities.

As used herein, a higher vulnerability score indicates that a processing node has a higher level of vulnerability, or is at a higher risk of being exploited. Conversely, a lower vulnerability score indicates that a processing node has a lower level of vulnerability, or is at a lower risk of being exploited. Other embodiments may use vulnerability scores in an opposite manner, wherein a higher vulnerability score indicates a lower vulnerability, and a lower vulnerability score indicates a higher vulnerability.

In one or more embodiments, a routing engine 110 refers to hardware and/or software configured to route a request, to one or more processing nodes, based on a vulnerability of one or more processing nodes. Examples of operations for routing a request based on a vulnerability of a processing node are described below with reference to FIG. 3.

A routing engine 110 may route a request by applying a load-based distribution algorithm 112, a vulnerability-based distribution algorithm 114, and/or other distribution algorithms (not shown).

A load-based distribution algorithm 112 is used to distribute workload to the processing nodes 116a-b based on the loads of the processing nodes 116a-b. As an example, a load-based distribution algorithm may include monitoring the loads of each processing node, determining a particular processing node associated with the lowest load, and routing a request to the particular processing node. As another example, a load-based distribution algorithm may include randomly selecting one of a set of processing nodes for processing each request. Based on the randomness of the algorithm, the distribution of the workload may be sufficiently even across the set of processing nodes. As another example, a load-based distribution algorithm may include distributing requests in round-robin fashion to a set of processing nodes including Node A, Node B, and Node C. A routing engine routes a first request to Node A, a second request to Node B, a third request to Node C, and a fourth request back to Node A. Based on the round-robin nature of the algorithm, the distribution of the workload may be sufficiently even across the set of processing nodes.

A vulnerability-based distribution algorithm 114 is used to distribute workload to the processing nodes 116a-b based on the vulnerabilities of the processing nodes 116a-b. As an example, a vulnerability-based distribution algorithm may include monitoring the vulnerability scores of each processing node, determining a particular processing node associated with the lowest vulnerability score, and routing a request to the particular processing node. As another example, a vulnerability-based distribution algorithm may include determining the vulnerabilities that may be exploited by a particular request, determining a particular processing node that does not include a vulnerability that may be exploited by the particular request, and routing the particular request to the particular node.

The load-based distribution algorithm 112, vulnerability-based distribution algorithm 114, and/or other distribution algorithms may be used in conjunction with one another. As an example, a routing engine may use a vulnerability-based distribution algorithm to determine a subset of processing nodes associated with a vulnerability score that is below a threshold value. The routing engine may then use a load-based distribution algorithm to select one of the subset of processing nodes. The routing engine may route a request to the selected processing node.

In one or more embodiments, a vulnerability analyzer 104 and/or routing engine 110 may be implemented as the same component, or different components.

In one or more embodiments, a vulnerability analyzer 104 and/or routing engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA).

In one or more embodiments, a vulnerability analyzer 104 and/or routing engine 110 is coupled to a data repository (not shown). One or more data repositories may store, for example, a candidate set of vulnerabilities 106, vulnerabilities scores 108, a load-based distribution algorithm 112, and/or a vulnerability-based distribution algorithm 114. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as the vulnerability analyzer 104 and/or routing engine 110. Alternatively or additionally, a data repository may be implemented or executed on a computing system separate from the vulnerability analyzer 104 and/or routing engine 110. A data repository may be communicatively coupled to the vulnerability analyzer 104 and/or routing engine 110 via a direct connection or via a network.

3. Determining a Vulnerability of a Processing Node

Figure 2:
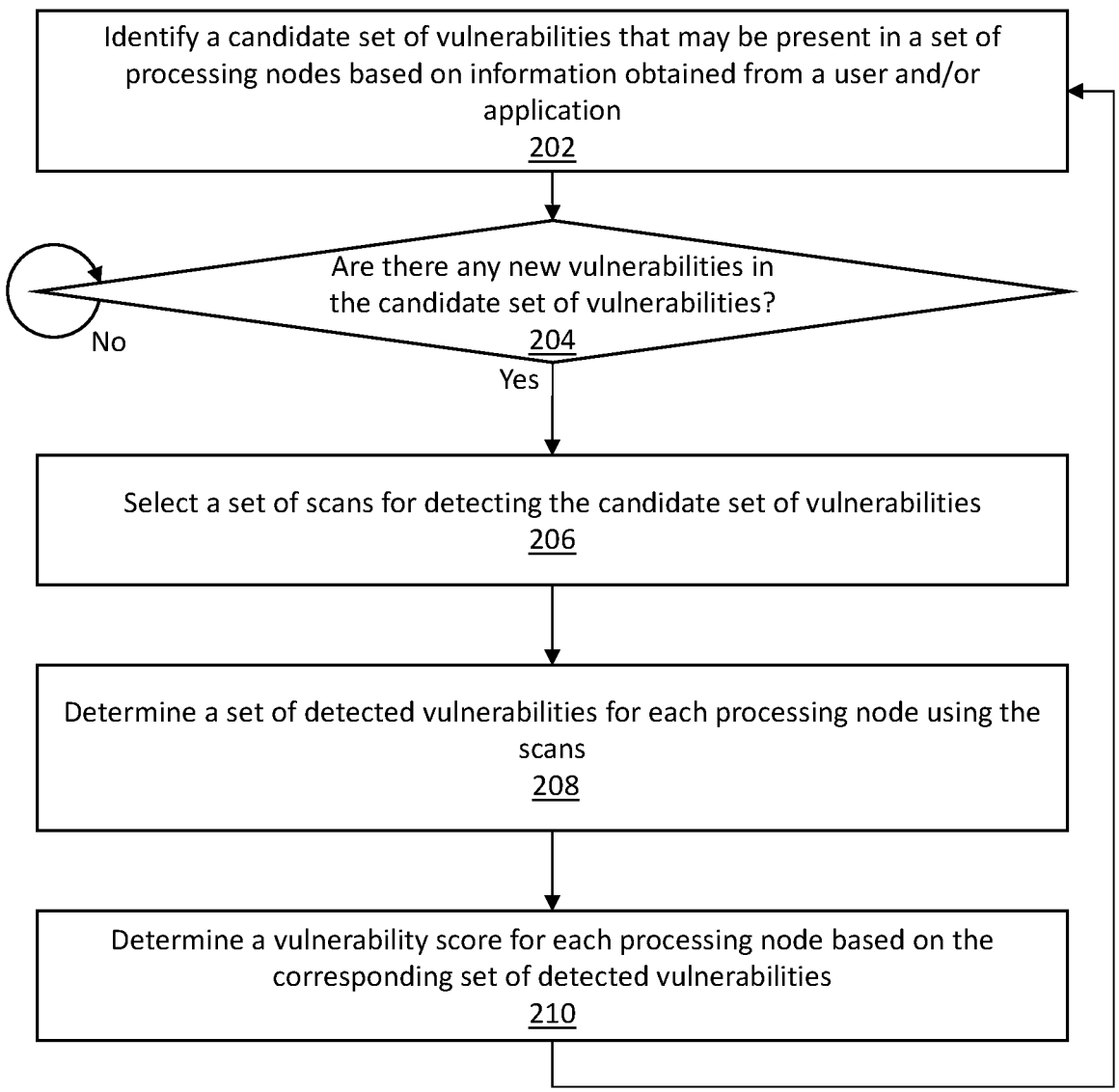
FIG. 2 illustrates an example set of operations for determining a vulnerability of a processing node, in accordance with one or more embodiments.

FIG. 2 illustrates an example set of operations for determining a vulnerability of a processing node, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include identifying a candidate set of vulnerabilities that may be present in a set of processing nodes based on information obtained from a user and/or another application (Operation 202). A vulnerability analyzer 104 obtains information regarding existing vulnerabilities from a user and/or another application. The vulnerability analyzer 104 may determine that all existing vulnerabilities are within the candidate set of vulnerabilities that may be present in the set of processing nodes. Alternatively, the vulnerability analyzer 104 may determine that only a subset of existing vulnerabilities are within the candidate set of vulnerabilities that may be present in the set of processing nodes, based on operating systems, applications, and/or other attributes of the set of processing nodes. As an example, a user may upload a list of existing vulnerabilities to a vulnerability analyzer via a user interface. The vulnerability analyzer may determine that the existing vulnerabilities are a candidate set of vulnerabilities that may be present in a particular set of processing nodes. As another example, a vulnerability analyzer may request and/or download a candidate set of vulnerabilities from a web server and/or a website. The vulnerability analyzer may download the NVD and/or the CVE List. The vulnerability analyzer may download other databases from other sources. The vulnerability analyzer 104 may compile information obtained from multiple sources into the candidate set of vulnerabilities.

The vulnerability analyzer 104 may periodically obtain an updated candidate set of vulnerabilities, which may be referred to as "scheduled vulnerability scanning or analysis." Additionally or alternatively, the vulnerability analyzer 104 may obtain an updated candidate set of vulnerabilities in response to a triggering event. This may be referred to as "on-demand vulnerability scanning or analysis" or "ad-hoc vulnerability scanning or analysis." As an example, a vulnerability analyzer may receive a notification indicating that a particular organization has just discovered a critical vulnerability in a common software application. The notification may trigger the vulnerability analyzer to obtain an updated candidate set of vulnerabilities from the particular organization. As another example, a vulnerability analyzer may receive a notification from a manager of a set of processing nodes. The notification may indicate that the set of processing nodes is experiencing a performance irregularity. The notification may trigger the vulnerability analyzer to obtain an updated candidate set of vulnerabilities from one or more sources.

One or more embodiments include determining whether there are any new vulnerabilities in the candidate set of vulnerabilities (Operation 204). Optionally, the vulnerability analyzer 104 may determine whether there are any new vulnerabilities in the candidate set of vulnerabilities prior to proceeding to Operations 206-210. The vulnerability analyzer 104 compares the current candidate set of vulnerabilities to a previously-obtained candidate set of vulnerabilities. If there are new vulnerabilities, then the vulnerability analyzer 104 proceeds to Operations 206-210. If there are no new vulnerabilities, then the vulnerability analyzer 104 waits until there are new vulnerabilities.

One or more embodiments include selecting a set of scans for detecting the candidate set of vulnerabilities (Operation 206). The vulnerability analyzer 104 selects a scan for detecting each vulnerability in the candidate set of vulnerabilities. The scan is configured to detect a particular vulnerability existing in a processing node. The vulnerability analyzer 104 may select the same scans for all processing nodes. Alternatively, the vulnerability analyzer 104 may select different scans for each processing node.

As an example, a candidate set of vulnerabilities may include a particular vulnerability that may exist on processing nodes executing Microsoft Windows 7, Microsoft Windows Server 2008, and Microsoft Windows Vista. A vulnerability analyzer may select a scan, to be performed on a particular processing node, that identifies the operating system of the particular processing node. The vulnerability analyzer may use the scan to determine whether the particular processing node is executing one of the affected operating systems.

As another example, a candidate set of vulnerabilities may include a particular vulnerability that may exist on processing nodes having a particular port (such as, Port 81) open. A vulnerability analyzer may select a port scan. The vulnerability analyzer may use the port scan to determine whether a particular processing node's Port 81 is open.

As another example, a candidate set of vulnerabilities may include a particular vulnerability that may exist on processing nodes that store a particular file in a file system. A vulnerability analyzer may select a scan of a file system. The vulnerability analyzer may use the scan to determine whether the particular file is stored in a particular processing node's file system.

As another example, a particular vulnerability may be associated with a known fix. The fix may be applied as a patch and/or update to a processing node. A vulnerability analyzer may select a scan that determines whether the fix has been applied to a particular processing node. The vulnerability analyzer may perform a closed loop compliance check to verify that the vulnerability has been fixed.

Additional examples of scans include but are not limited to a scan of the hosts of a processing node, a scan of the protocols used by a processing node, a payment card industry (PCI) scan to determine whether a processing node complies with PCI standards, and a scan of network links used by a processing node. Further examples include a web application security scan, a database security scan, and a host-based vulnerability scan.

One or more embodiments include determining a set of detected vulnerabilities for each processing node using the scans (Operation 208). The vulnerability analyzer 104 executes the selected scans on the set of processing nodes. Based on the scans, the vulnerability analyzer 104 determines whether a particular vulnerability exists in a particular processing node. The vulnerability analyzer 104 determines a set of [vulnerabilities for each processing node.

The detection of a vulnerability in a processing node does not depend on whether the processing node has been attacked, or whether the vulnerability has been exploited. By scanning a processing node, a vulnerability may be detected before the attack or exploitation occurs. A processing node that includes a vulnerability may still operate and/or function as expected. A processing node including a vulnerability may have a similar performance level as similar processing nodes that do not include the vulnerability.

As an example, a known vulnerability exists in processing nodes that execute a particular software application and have Port 81 open. A known fix for the vulnerability also exists. A first processing node and a second processing node may be associated with the same processing power, the same amount of memory, the same operating system, and other similar capabilities. Each of the first processing node and the second processing node may execute the particular software application and have Port 81 open. However, the fix has been applied to the second processing node but not the first processing node. Therefore, the first processing node includes the vulnerability, while the second processing node does not include the vulnerability. Even though the first processing node includes the vulnerability, and the second processing node does not include the vulnerability, the first processing node and the second processing node may have a similar performance level. The first processing node and the second processing node may achieve performance speeds that are within a particular range of each other. Additionally or alternatively, the first processing node and the second processing node may have a similar workload capacity, and/or other performance attributes.

One or more embodiments include determining a vulnerability score for each processing node based on the corresponding set of detected vulnerabilities (Operation 210). The vulnerability analyzer 104 may use various algorithms for determining vulnerability scores.

In an embodiment, a vulnerability score for a processing node is the total number of detected vulnerabilities found in the processing node.

In an embodiment, a vulnerability score for a processing node is a weighted sum corresponding to the detected vulnerabilities found in the processing node.

As an example, each vulnerability, in a candidate set of vulnerabilities, may be associated with a severity score. Severity scores may range from 0 to 10, with a higher severity score indicating a higher severity. The vulnerability databases obtained by the vulnerability analyzer (such as, the NVD and/or the CVE List) may indicate the severity score corresponding to each vulnerability. Vulnerability A may be associated with a severity score of 7.5. Vulnerability B may be associated with a severity score of 5.0. Vulnerability C may be associated with a severity score of 4.5. A vulnerability analyzer may determine that a first processing node includes Vulnerability A and Vulnerability B. The vulnerability analyzer may calculate a weighted sum corresponding to the detected vulnerabilities using the severity scores of Vulnerability A and Vulnerability B. The vulnerability score may be determined as 7.5/10+5.0/10=1.25. The vulnerability analyzer may determine that a second processing node includes Vulnerability B and Vulnerability C. The vulnerability analyzer may calculate a weighted sum corresponding to the detected vulnerabilities using the severity scores of Vulnerability B and Vulnerability C. The vulnerability score may be determined as 5.0/10+4.5/10=0.95.

In the above example, each of the first processing node and the second processing node includes two vulnerabilities. However, because the vulnerabilities in each processing node are associated with different severity scores, a different vulnerability score is determined for each processing node. Hence, the first processing node has a higher vulnerability score than the second processing node, indicating that the first processing node is more vulnerable to exploitation and/or attack than the second processing node.

As another example, each vulnerability, in a candidate set of vulnerabilities, may be associated with a date of discovery. Vulnerability A may have been added to the candidate set of vulnerabilities on Jan. 1, 2015. Vulnerability B may have been added to the candidate set of vulnerabilities on Jan. 1, 2016. A vulnerability analyzer may determine that a first processing node includes Vulnerability A, and a second processing node includes Vulnerability B. Based on how recently Vulnerability A and Vulnerability B were discovered, the vulnerability analyzer may determine a lower vulnerability score for the first processing node, and a higher vulnerability score for the second processing node.

In the above example, each of the first processing node and the second processing node includes one vulnerability. However, because the vulnerabilities were discovered on different dates, a different vulnerability score is determined for each processing node. A vulnerability that is more recently discovered is less likely to have an available fix. A vulnerability that is more recently discovered is more likely to attract more hackers. Hence, the second processing node has a higher vulnerability score than the first processing node, indicating that the second processing node is more vulnerable to exploitation and/or attack than the first processing node.

As another example, the vulnerability databases obtained by the vulnerability analyzer (such as, the NVD and/or the CVE List) may indicate whether or not each vulnerability is associated with a known remediation or fix. Vulnerability A may be associated with a known fix. Vulnerability B is not associated with a known fix. A vulnerability analyzer may determine that a first processing node includes Vulnerability A, and a second processing node includes Vulnerability B. Based on whether each vulnerability is associated with a known fix, the vulnerability analyzer may determine a lower vulnerability score for the first processing node, and a higher vulnerability score for the second processing node.

Figure 3:
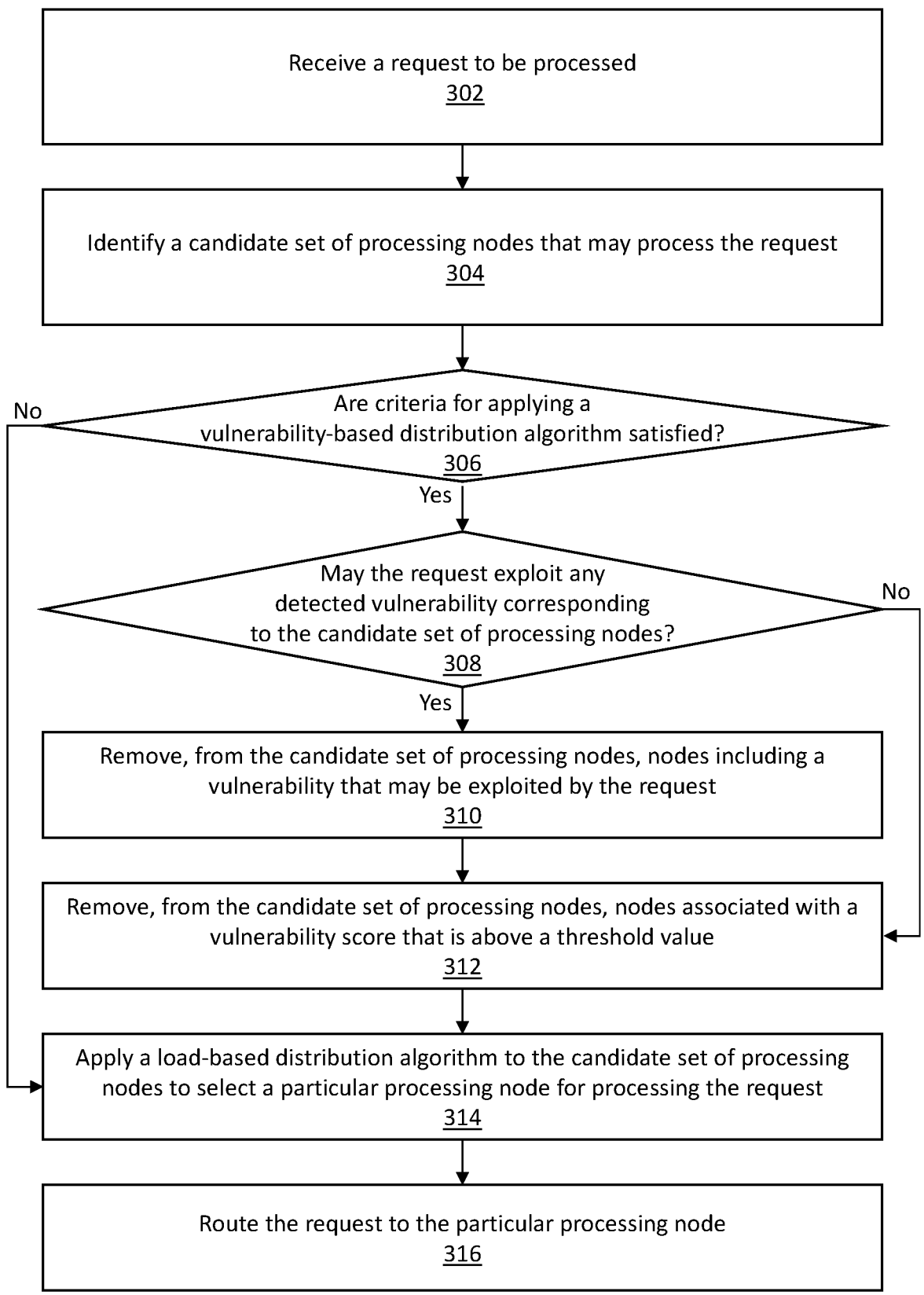
FIG. 3 illustrates an example set of operations for routing a request based on a vulnerability of a processing node, in accordance with one or more embodiments.

In the above example, each of the first processing node and the second processing node includes one vulnerability. However, because Vulnerability A is associated with a known fix while Vulnerability B is not, a different vulnerability score is determined for each processing node. A vulnerability that is not associated with a known fix is more likely to have a more serious and/or severe consequence when exploited. A vulnerability that is not associated with a known fix is more likely to attract more hackers. Hence, the second processing node has a higher vulnerability score than the first processing node, indicating that the second processing node is more vulnerable to exploitation and/or attack than the first processing node 4. Routing a Request Based on a Vulnerability of a Processing Node FIG. 3 illustrates an example set of operations for routing a request based on a vulnerability of a processing node, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include receiving a request to be processed by at least one of a set of processing nodes (Operation 302). An interface 102 receives a request to be processed from a user and/or another application. The interface 102 forwards the request to a routing engine 110.

One or more embodiments include identifying a candidate set of processing nodes that may process the request (Operation 304). The routing engine 110 identifies a candidate set of processing node that may process the request. Initially, the candidate set of processing nodes may include all available processing nodes. As an example, an initial candidate set of processing nodes may include all operating servers in a server farm. As further described below with reference to Operations 306-312, one or more processing nodes may be eliminated from the candidate set of processing nodes.

One or more embodiments include determining whether criteria for applying a vulnerability-based distribution algorithm are satisfied (Operation 306). In a default scenario (where criteria for applying a vulnerability-based distribution algorithm are not satisfied), the routing engine 110 may apply a load-based distribution algorithm, as further described below with reference to Operation 314.

Various criteria may be used for determining that a vulnerability-based distribution algorithm should be used.

One criterion may be, for example, the discovery of a new vulnerability that is associated with a severity score above a threshold value. The routing engine 110 may receive a notification regarding the discovery of the new vulnerability. Based on the notification, the routing engine 110 may apply a vulnerability-based distribution algorithm.

Another criterion may be, for example, a configuration setting applied by a user and/or another application. The user and/or application may subscribe to notifications generated by the vulnerability analyzer. The user and/or application may change the configuration setting based on the notifications. As an example, an administrator may apply a manual configuration to a routing engine. The administrator may configure the routing engine to apply a vulnerability-based distribution algorithm. Based on the configuration, the routing engine may apply a vulnerability-based distribution algorithm.

Another criterion may be, for example, a level of traffic that exceeds a historical level of traffic. The routing engine 110 may monitor the level of traffic to and from the set of processing nodes. The routing engine 110 may compute an average level of traffic over a particular time period. The routing engine 110 may determine that a current level of traffic exceeds the average level of traffic by more than a threshold value. Based on the level of traffic, the routing engine 110 may apply a vulnerability-based distribution algorithm.

Additional and/or alternative criteria may be used for determining whether to apply a vulnerability-based distribution algorithm.

One or more embodiments include determining whether the request may exploit any detected vulnerability corresponding to the candidate set of processing nodes (Operation 308). The vulnerability databases (such as, the NVD and/or the CVE List), obtained by the vulnerability analyzer 104, may indicate which type of requests may exploit which vulnerabilities. Additionally or alternatively, the vulnerability databases (such as, the NVD and/or the CVE List) may indicate one or more attributes of requests that may exploit a particular vulnerability.

As an example, a particular vulnerability may be exploited only by requests adhering to a certain protocol. As another example, a particular vulnerability may be exploited only by requests communicated via a particular port and/or interface. As another example, a particular vulnerability may be exploited only by requests including a particular piece of content and/or code. As another example, a particular vulnerability may be exploited only by a series of requests that cause certain operations to be performed.

The routing engine 110 analyzes the request received at Operation 302. The routing engine 110 determines whether the request is of a type that may exploit any vulnerabilities detected in the set of processing nodes. The routing engine 110 determines whether the request is associated with any attributes indicating that the request may exploit any vulnerabilities detected in the set of processing nodes.

As an example, a subset of a set of processing nodes may include a particular vulnerability that may be exploited only by UDP requests. However, none of the set of processing nodes includes any vulnerability that may be exploited by a TCP request. A routing engine may receive a particular TCP request. The routing engine may determine that the particular TCP request cannot exploit any vulnerabilities detected in the set of processing nodes.

In an embodiment, an exception may apply if all processing nodes include a vulnerability that may be exploited by the request received at Operation 302. The routing engine may be associated with a particular policy configuration that specifies how to route the request if all processing nodes include a vulnerability that may be exploited by the request received at Operation 302. A policy configuration may provide, for example, that the request is not served at all. Alternatively, a policy configuration may provide that the request can be served if a vulnerability score of at least one processing node is below a threshold value. Alternatively, a policy configuration may provide that the request can be served by any processing node associated with the lowest load. Alternatively, a policy configuration may provide that the request can be served by any processing node, selected based on a random number generator and/or a pseudo-random number generator.

One or more embodiments include removing, from the candidate set of processing nodes, nodes including a vulnerability that may be exploited by the request (Operation 310). The routing engine 110 identifies the processing nodes that include a vulnerability that may be exploited by the request received at Operation 302. The routing engine 110 removes the identified processing nodes from the candidate set of processing nodes that may process the request. Hence, the routing engine 110 avoids routing the request to a processing node that may be exploited by the request. In one example, the routing engine 110 removes a particular node from the candidate set of processing nodes by temporarily disabling the particular node, or by marking the particular node as unhealthy.

As an example, a candidate set of processing nodes may include Node A, Node B, and Node C. Node A may include a vulnerability that may be exploited by UDP requests. Node B may include another vulnerability that may be exploited by UDP requests. A routing engine may receive a particular UDP request. The routing engine may remove both Node A and Node B from the candidate set of processing nodes. Hence, only Node C remains in the candidate set of processing nodes.

As another example, a candidate set of processing nodes may include Node A and Node B. Node A may include a vulnerability that may be exploited only by requests to get data (such as, GET requests) associated with a particular set of query parameters. Node B may include a vulnerability that may be exploited only by GET requests associated with another set of query parameters. A routing engine may receive a particular GET request. The particular GET request is associated with a query parameter that may be used to exploit Node A, but not Node B. The routing engine may remove Node A from the candidate set of processing nodes, while keeping Node B in the candidate set of processing nodes.

As another example, a candidate set of processing nodes may include Node A and Node B. Node A may include a vulnerability that may be exploited only by requests to submit data (such as, POST requests) associated with a particular set of content to be uploaded. Node B may include a vulnerability that may be exploited only by POST requests associated with another set of content to be uploaded. A routing engine may receive a particular POST request. The particular POST request is associated with content that may be used to exploit Node A, but not Node B. The routing engine may remove Node A from the candidate set of processing nodes, while keeping Node B in the candidate set of processing nodes.

As another example, a candidate set of processing nodes may include Node A and Node B. Node A may include a vulnerability that may be exploited only by requests to submit data (such as, POST requests), but not requests to get data (such as, GET requests). Node B may include a vulnerability that may be exploited only by GET requests, but not POST requests. A routing engine may receive a particular POST request. The routing engine may remove Node A from the candidate set of processing nodes, while keeping Node B in the candidate set of processing nodes.

As another example, a candidate set of processing nodes may include Node A and Node B. Node A may include a vulnerability that may be exploited only by requests encoded using basic access authentication (such as, Base64 encoding). Node B may include a vulnerability that may be exploited only by requests encoded using digest authentication. A routing engine may receive a particular request that is encoded using basic authentication. The routing engine may remove Node A from the candidate set of processing nodes, while keeping Node B in the candidate set of processing nodes.

One or more embodiments include removing, from the candidate set of processing nodes, nodes associated with a vulnerability score that is above a threshold value (Operation 312). The routing engine 110 compares the vulnerability score of each processing node, in the candidate set of processing nodes, to the threshold value. If the vulnerability score corresponding a processing node is above the threshold value, then the routing engine 110 removes the processing node from the candidate set of processing nodes.

The routing engine 110 may obtain the threshold value from a user and/or another application. Additionally or alternatively, the routing engine 110 may determine the threshold value. As an example, the routing engine 110 may determine that the threshold value is the median and/or average of the vulnerability scores of the candidate set of processing nodes. As an example, the routing engine 110 may determine that the threshold value is the value corresponding to the 90th percentile of the vulnerability scores of the candidate set of processing nodes.

In an alternative embodiment, the routing engine 110 may remove a certain percentage of processing nodes, associated with the highest vulnerability scores, from the candidate set of processing nodes. As an example, prior to Operation 312, a candidate set of processing nodes may include 50 processing nodes. A routing engine may remove 90% of the processing nodes, associated with the highest vulnerability scores, from the candidate set of processing nodes. The routing engine may determine that 90% of the candidate set of processing nodes is equivalent to 40 processing nodes. The routing engine may identify the 40 processing nodes associated with the highest vulnerability scores and remove the identified processing nodes from the candidate set of processing nodes.

In an alternative embodiment, the routing engine 110 may remove all but one processing node from the candidate set of processing node. In effect, the routing engine 110 selects the processing node associated with the lowest vulnerability score.

One or more embodiments include applying a load-based distribution algorithm to the candidate set of processing nodes to select a particular processing node for processing the request (Operation 314). If the candidate set of processing nodes that may process the request includes only one processing node, then the routing engine 110 need not apply any additional distribution algorithms. The routing engine 110 selects the sole processing node, in the candidate set of processing nodes, for processing the request.

If the candidate set of processing nodes that may process the request includes more than one processing node, then the routing engine 110 applies a load-based distribution algorithm and/or alternate distribution algorithms to the candidate set of processing nodes. In some embodiments, the routing engine 110 may select multiple processing nodes, from the candidate set of processing nodes, for processing the request.

As an example, a load-based distribution algorithm may include selecting a particular processing node that is associated with a lowest load. A candidate set of processing nodes may include Node A and Node B. A routing engine may determine that a load of Node A is 45, and a load of Node B is 70. Since Node A is associated with the lowest load, the routing engine may select Node A for processing the request.

Additional and/or alternative factors may be used for selecting one of the candidate set of processing nodes for processing the request. A routing engine may select a processing node based on, for example, a session associated with a current request. The routing engine may route all requests of the same session to the same processing node.

As an example, a routing engine receives a request to be processed by one of a set of processing nodes. The request may be an initial request of a particular session. Based on the detected vulnerabilities and/or loads associated with the set of processing nodes, the routing engine may route the initial request to Node A. Subsequently, the routing engine may receive another request of the same session. Without analyzing the vulnerabilities and/or loads, the routing engine may route the subsequent request, of the same session, to the same node—namely, Node A.

As another example, a routing engine receives a request to be processed by one of a set of processing nodes. The request may be an initial request of a particular session. A candidate set of processing nodes for processing the initial request may include Node A, Node B, and Node C. The routing engine may determine that Node A is associated with a vulnerability score of 7.0, Node B is associated with a vulnerability score of 4.0, and Node C is associated with a vulnerability score of 3.0. The routing engine may remove, from the candidate set of processing nodes, any processing nodes associated with a vulnerability score above a threshold value of 5.0. The candidate set of processing nodes may now include Node B and Node C, but not Node A. Based on the loads of Node B and Node C, the routing engine may route the initial request to Node B. Subsequently, the routing engine may receive a second request of the same session. The routing engine may determine that the initial request of the same session was routed to Node B. The routing engine may determine that Node B is now associated with a vulnerability score of 6.0, which is higher than the previously-used threshold value of 5.0. However, the routing engine may determine that a different threshold value applies for cases where session information is available. In particular, processing nodes are removed from the candidate set of processing node if the vulnerability score is above a threshold value of 6.5 (rather than 5.0). Hence, the candidate set of processing nodes may include Node B and Node C. Without analyzing the loads of Node B and Node C, the routing engine may route the second request, of the same session, to the same node—namely, Node B.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 4:
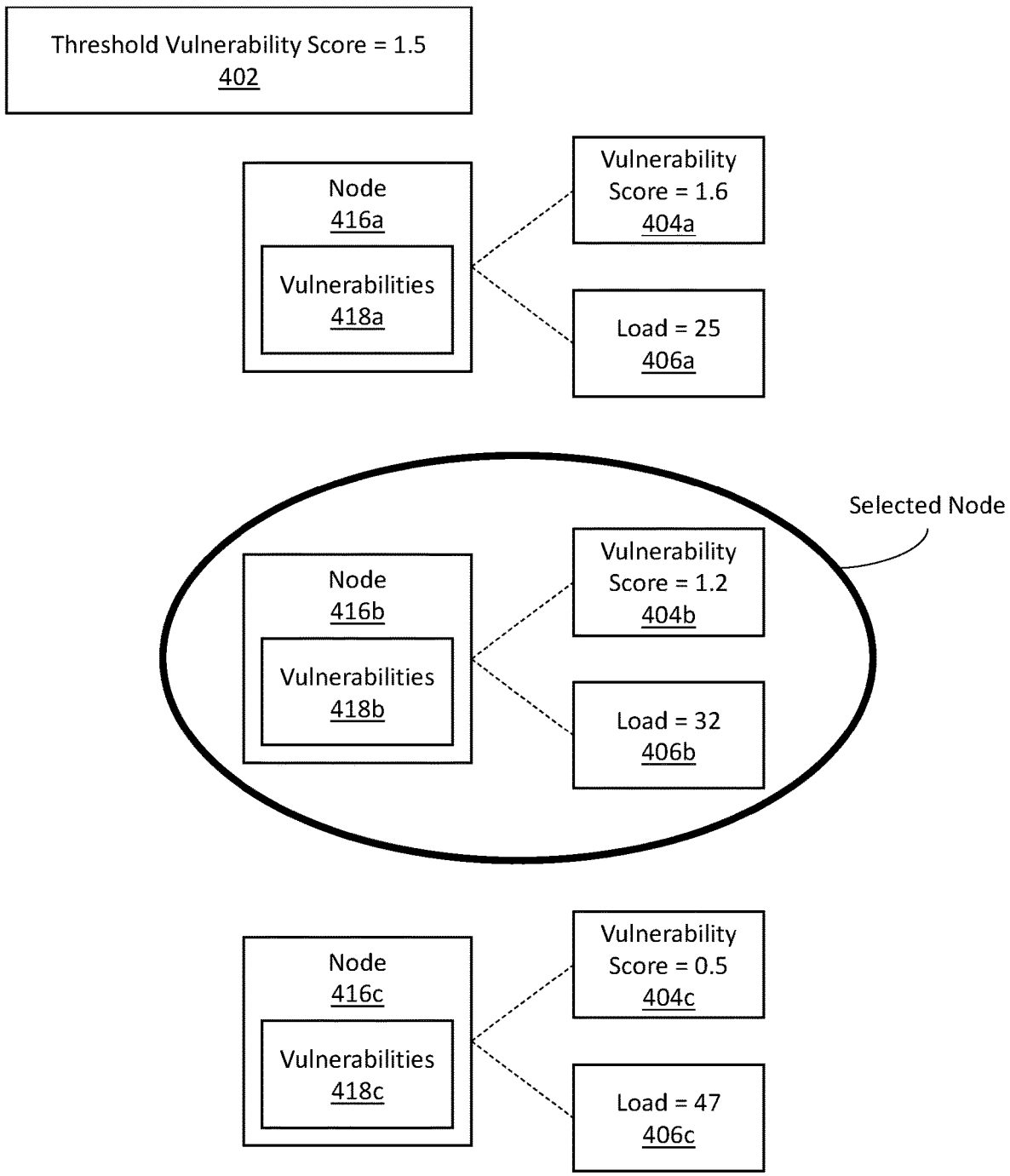
FIG. 4 illustrates an example of routing a request based on a vulnerability score of a processing node, in accordance with one or more embodiments.

FIG. 4 illustrates an example of routing a request based on a vulnerability score of a processing node, in accordance with one or more embodiments.

As illustrated, a set of processing nodes includes node 416a, node 416b, and node 416c. Node 416a includes vulnerabilities 418a. Node 416b includes vulnerabilities 418b. Node 416c includes vulnerabilities 418c.

A vulnerability analyzer obtains a candidate set of vulnerabilities based on the NVD, the CVE List, and other sources. The information obtained includes a severity score corresponding to each vulnerability, known fixes for each vulnerability, a date of discovery for each vulnerability, and attributes of requests that may exploit each vulnerability. The information obtained indicates that Vulnerability A is associated with a severity score of 9.0; Vulnerability B is associated with a severity score of 7.0; and Vulnerability C is associated with a severity score of 5.0.

The vulnerability analyzer selects one or more scans for detecting each vulnerability in the candidate set of vulnerabilities across the set of processing nodes. The selected scans may include a port scan, and a file system scan.

The vulnerability analyzer executes the selected scans on each of the processing nodes. The vulnerability analyzer determines that vulnerabilities 418a includes Vulnerability A and Vulnerability B, vulnerabilities 418b includes Vulnerability B and Vulnerability C, and vulnerabilities 418c includes Vulnerability C.

The vulnerability analyzer determines vulnerabilities scores based on the detected vulnerabilities. The vulnerability analyzer may compute a weighted sum corresponding to the detected vulnerabilities, weighted by the corresponding severity scores. For node 416a, the vulnerability score 404a is computed as 9.0/10+7.0/10=1.6. For node 416b, the vulnerability score 404b is computed as 7.0/10+5.0/10=1.2. For node 416c, the vulnerability score 404c is computed as 5.0/10=0.5.

A routing engine receives a request to be processed one of node 416a, node 416b, and node 416c. The routing engine identifies node 416a, node 416b, and node 416c as the candidate set of processing nodes for processing the request.

The routing engine determines whether the criteria for applying a vulnerability-based distribution algorithm has been satisfied. The routing engine received a notification within the past week, indicating that a new critical vulnerability has just been discovered. The notification satisfies the criteria for applying the vulnerability-based distribution algorithm.

The routing engine determines that a threshold value 402 for removing processing nodes, from the candidate set of processing nodes, is 1.5. The routing engine determines that the vulnerability score 404a is above the threshold value 402. The routing engine determines that the vulnerability score 404b and the vulnerability score 404c are below the threshold value 402. The routing engine removes node 416a, associated with vulnerability score 404a, from the candidate set of processing nodes for processing the request. Hence, the candidate set of processing nodes now includes node 416b and node 416c, but not node 416a.

The routing engine applies a load-based distribution algorithm to the candidate set of processing nodes. The routing engine determines that a load 406b of node 416b is 32 and a load 406c of node 416c is 47. Since node 416b is associated with a lower load than node 416c, the routing engine selects node 416b. The routing engine requests the request to node 416b for processing.

In this example, node 416a is associated with a load 406a of 25. Node 416b is associated with a load 406b of 32. Node 416c is associated with a load 406c of 47. Hence, node 416a has the lowest load. However, node 416a is not selected for processing the request. Node 416a has been removed from the candidate set of processing nodes for having a vulnerability score that is above the threshold value of 1.5.

Further, node 416a is associated with a vulnerability score 404a of 1.6. Node 416b is associated with a vulnerability score 404b of 1.2. Node 416c is associated with a vulnerability score 404c of 0.5. Hence, node 416c has the lowest vulnerability score. However, node 416c is not selected for processing the request. Both node 416b and node 416c have vulnerability scores below the threshold value. A load-based distribution algorithm is applied to node 416b and node 416c. Since node 416b has a lower load than node 416c, node 416b is selected for processing the request.

Figure 5:
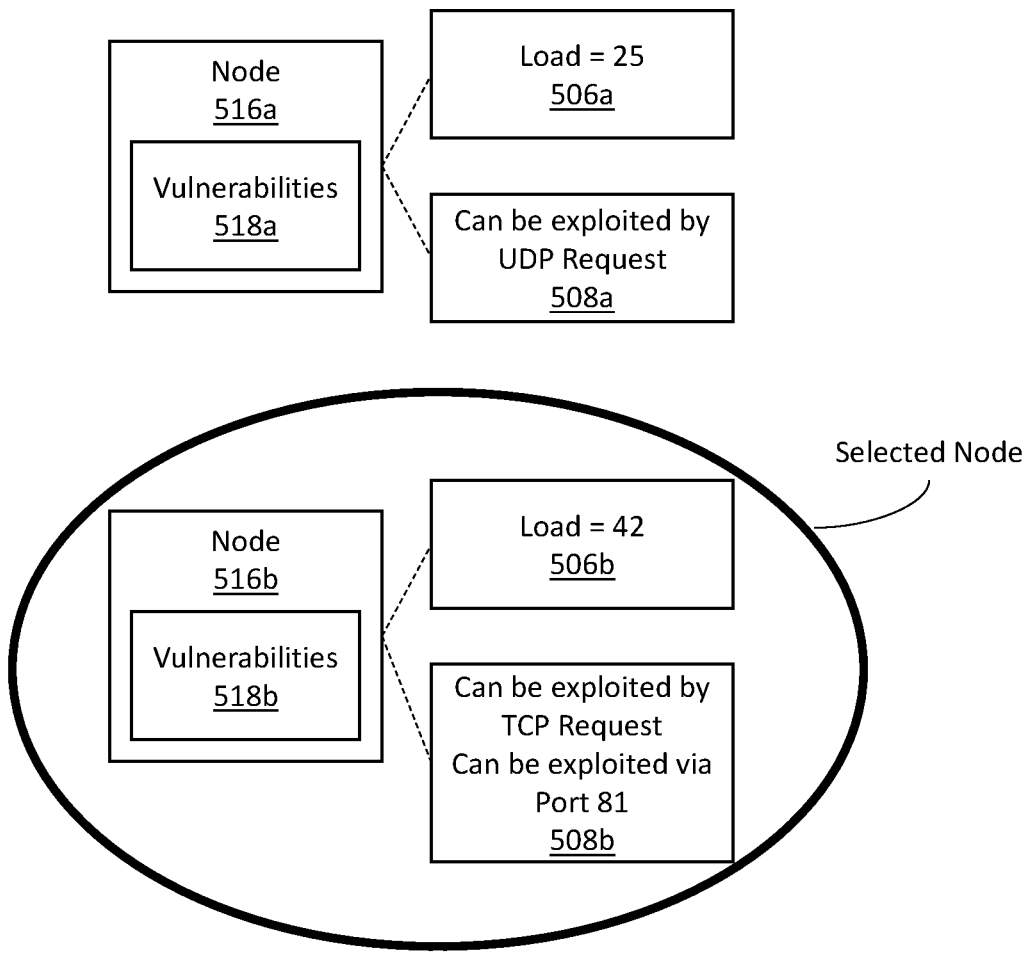
FIG. 5 illustrates an example of routing a request based on whether a processing node includes a vulnerability that may be exploited by the request, in accordance with one or more embodiments.

FIG. 5 illustrates an example of routing a request based on whether a processing node includes a vulnerability that may be exploited by the request, in accordance with one or more embodiments.

As illustrated, a set of processing nodes includes node 516a and node 516b. Node 416a includes vulnerabilities 418a. Node 416b includes vulnerabilities 418b.

A vulnerability analyzer obtains a candidate set of vulnerabilities based on the NVD, the CVE List, and other sources. The information obtained includes a severity score corresponding to each vulnerability, known fixes for each vulnerability, a date of discovery for each vulnerability, and attributes of requests that may exploit each vulnerability. The information obtained indicates that Vulnerability A may be exploited by a UDP request; Vulnerability B may be exploited by a TCP request; and Vulnerability C may be exploited by a request communicated via Port 81, regardless of the protocol used.

The vulnerability analyzer selects one or more scans for detecting each vulnerability in the candidate set of vulnerabilities across the set of processing nodes. The selected scans may include a port scan, and a file system scan.

The vulnerability analyzer executes the selected scans on each of the processing nodes. The vulnerability analyzer determines that vulnerabilities 518a includes Vulnerability A, and vulnerabilities 518b includes Vulnerability B and Vulnerability C.

A routing engine receives a request to be processed by one of node 516a and node 516b. The request is a UDP request communicated on Port 80. (In an example, Port 80 is a well-known port for communicating Hypertext Transfer Protocol (HTTP) requests.) The routing engine identifies node 516a and node 516b as the candidate set of processing nodes for processing the request.

The routing engine determines whether the request may exploit any detected vulnerability corresponding to the candidate set of processing nodes. The routing engine determines that the request may exploit Vulnerability A, which is included in node 516a. The routing engine determines that the request cannot exploit Vulnerability B and Vulnerability C. The routing engine removes node 516a from the candidate set of processing nodes for processing the request. The candidate set of processing nodes now includes node 516b, but not node 516a.

Since node 516b is the sole node in the candidate set of processing nodes, the routing engine selects node 516b for processing the request. The routing engine routes the request to node 516b for processing.

In this example, node 516a is associated with a load 506a of 25. Node 516b is associated with a load 506b of 42. Hence, node 516a has the lowest load. However, requests that may exploit node 516a include UDP requests (illustrated as 508a). Requests that may exploit node 516b include TCP requests and requests communicated via Port 81 (illustrated as 508b). The routing engine has received a UDP request via Port 80. Therefore, node 516a can be exploited by the request, but node 516b cannot be exploited by the request. Node 516a is removed from the candidate set of processing nodes. Hence, node 516b is selected for processing the request.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
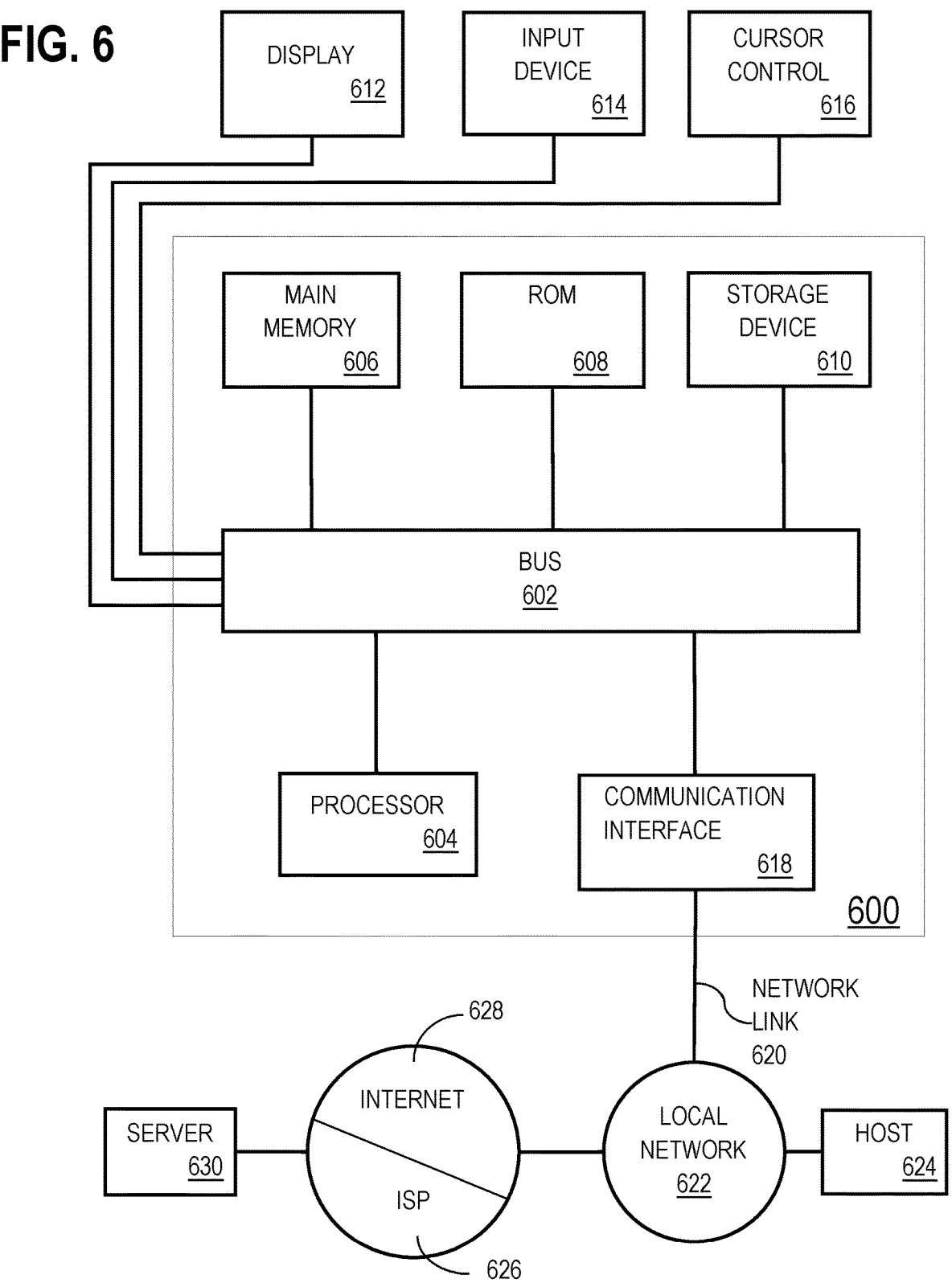
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    identifying a candidate set of one or more vulnerabilities associated with a plurality of processing nodes;
    analyzing each processing node, of the plurality of processing nodes, to determine a respective subset of the candidate set of one or more vulnerabilities that are detected in each processing node;
    determining, for each processing node, a respective vulnerability score based on the respective subset of the candidate set of vulnerabilities that are detected in each processing node;
    receiving a first request to be processed by at least one of the plurality of processing nodes;
    determining whether one or more criteria for applying a vulnerability-based distribution algorithm for the first request are satisfied;
    responsive to determining that the one or more criteria for applying the vulnerability-based distribution algorithm for the first request are satisfied:
        selecting a first processing node, of the plurality of processing nodes, for processing the first request based at least on the respective vulnerability score for each processing node;
        routing the first request to the first processing node;
    receiving a second request to be processed by at least one of the plurality of processing nodes;
    determining whether the one or more criteria for applying the vulnerability-based distribution algorithm for the second request are satisfied;
    responsive to determining that the one or more criteria for applying the vulnerability-based distribution algorithm for the second request are not satisfied:
        selecting a second processing node, of the plurality of processing nodes, for processing the second request without using the respective vulnerability score for each processing node;
        routing the second request to the second processing node.

2. The one or more non-transitory machine-readable media of claim 1 further storing instructions which cause:
    determining that a new vulnerability has been added to the candidate set of one or more vulnerabilities;
    wherein determining that the one or more criteria for applying the vulnerability-based distribution algorithm for the first request are satisfied is responsive at least to determining that the new vulnerability has been added to the candidate set of one or more vulnerabilities.

3. The one or more non-transitory machine-readable media of claim 2 further storing instructions which cause:
    determining that a severity score associated with the new vulnerability is above a threshold value;
    wherein determining that the one or more criteria for applying the vulnerability-based distribution algorithm for the first request are satisfied is further responsive to determining that the severity score associated with the new vulnerability is above the threshold value.

4. The one or more non-transitory machine-readable media of claim 1 further storing instructions which cause:
    determining a level of traffic associated with the plurality of processing nodes;
    wherein determining that the one or more criteria for applying the vulnerability-based distribution algorithm for the first request are satisfied is based on the level of traffic associated with the plurality of processing nodes.

5. The one or more non-transitory machine-readable media of claim 4, wherein determining that the one or more criteria for applying the vulnerability-based distribution algorithm for the first request are satisfied is responsive to determining that the level of traffic associated with the plurality of processing nodes is above a threshold value.

6. The one or more non-transitory machine-readable media of claim 5 further storing instructions which cause:
    determining the threshold value based on a historical level of traffic associated with the plurality of processing nodes.

7. The one or more non-transitory machine-readable media of claim 1, wherein the second processing node is selected for processing the second request based on a load-based distribution algorithm.

8. The one or more non-transitory machine-readable media of claim 1, wherein the respective vulnerability score for each processing node is based on a respective number of vulnerabilities that are detected in each processing node.

9. The one or more non-transitory machine-readable media of claim 1, wherein the respective vulnerability score for each processing node is based on respective severity scores of vulnerabilities that are detected in each processing node.

10. The one or more non-transitory machine-readable media of claim 1, wherein selecting the first processing node, of the plurality of processing nodes, for processing the first request based at least on the respective vulnerability score for each processing node comprises:

ranking the plurality of processing nodes based on the respective vulnerability score for each processing node.

11. The one or more non-transitory machine-readable media of claim 1, wherein selecting the first processing node, of the plurality of processing nodes, for processing the first request based at least on the respective vulnerability score for each processing node comprises:
determining that the respective vulnerability score for the first processing node is below a threshold value.

12. The one or more non-transitory machine-readable media of claim 1 further storing instructions which cause:
determining that a new vulnerability has been added to the candidate set of one or more vulnerabilities;
determining that a severity score associated with the new vulnerability is above a severity threshold value;
determining a level of traffic associated with the plurality of processing nodes;
determining a traffic threshold value based on a historical level of traffic associated with the plurality of processing nodes determining that the level of traffic associated with the plurality of processing nodes is above the traffic threshold value;
wherein determining that the one or more criteria for applying the vulnerability-based distribution algorithm for the first request are satisfied is responsive at least to (a) determining that the severity score associated with the new vulnerability is above the severity threshold value, and (b) determining that the level of traffic associated with the plurality of processing nodes is above the traffic threshold value;
wherein the second processing node is selected for processing the second request based on a load-based distribution algorithm;
wherein the respective vulnerability score for each processing node is based on (a) a respective number of vulnerabilities that are detected in each processing node, and (b) respective severity scores of vulnerabilities that are detected in each processing node;
wherein selecting the first processing node, of the plurality of processing nodes, for processing the first request based at least on the respective vulnerability score for each processing node comprises: ranking the plurality of processing nodes based on the respective vulnerability score for each processing node.

13. A method comprising:
identifying a candidate set of one or more vulnerabilities associated with a plurality of processing nodes;
analyzing each processing node, of the plurality of processing nodes, to determine a respective subset of the candidate set of one or more vulnerabilities that are detected in each processing node;
determining, for each processing node, a respective vulnerability score based on the respective subset of vulnerabilities that are detected in each processing node;
receiving a first request to be processed by at least one of the plurality of processing nodes;
determining whether one or more criteria for applying a vulnerability-based distribution algorithm for the first request are satisfied;
responsive to determining that the one or more criteria for applying the vulnerability-based distribution algorithm for the first request are satisfied:
selecting a first processing node, of the plurality of processing nodes, for processing the first request based at least on the respective vulnerability score for each processing node;
routing the first request to the first processing node;
receiving a second request to be processed by at least one of the plurality of processing nodes;
determining whether the one or more criteria for applying the vulnerability-based distribution algorithm for the second request are satisfied;
responsive to determining that the one or more criteria for applying the vulnerability-based distribution algorithm for the second request are not satisfied:
selecting a second processing node, of the plurality of processing nodes, for processing the second request without using the respective vulnerability score for each processing node; and
routing the second request to the second processing node;
wherein the method is performed by at least one device including a hardware processor.

14. The method of claim 13 further comprising:
determining that a new vulnerability has been added to the candidate set of one or more vulnerabilities;
wherein determining that the one or more criteria for applying the vulnerability-based distribution algorithm for the first request are satisfied is responsive at least to determining that the new vulnerability has been added to the candidate set of one or more vulnerabilities.

15. The method of claim 14 further comprising:
determining that a severity score associated with the new vulnerability is above a threshold value;
wherein determining that the one or more criteria for applying the vulnerability-based distribution algorithm for the first request are satisfied is further responsive to determining that the severity score associated with the new vulnerability is above the threshold value.

16. The method of claim 13 further comprising:
determining a level of traffic associated with the plurality of processing nodes;
wherein determining that the one or more criteria for applying the vulnerability-based distribution algorithm for the first request are satisfied is based on the level of traffic associated with the plurality of processing nodes.

17. The method of claim 16, wherein determining that the one or more criteria for applying the vulnerability-based distribution algorithm for the first request are satisfied is responsive to determining that the level of traffic associated with the plurality of processing nodes is above a threshold value.

18. The method of claim 17 further comprising:
determining the threshold value based on a historical level of traffic associated with the plurality of processing nodes.

19. The method of claim 13, wherein the second processing node is selected for processing the second request based on a load-based distribution algorithm.

20. The method of claim 13, wherein the respective vulnerability score for each processing node is based on a respective number of vulnerabilities that are detected in each processing node.

21. The method of claim 13, wherein the respective vulnerability score for each processing node is based on respective severity scores of vulnerabilities that are detected in each processing node.

22. The method of claim 13, wherein selecting the first processing node, of the plurality of processing nodes, for processing the first request based at least on the respective vulnerability score for each processing node comprises:
ranking the plurality of processing nodes based on the respective vulnerability score for each processing node.

23. The method of claim 13, wherein selecting the first processing node, of the plurality of processing nodes, for processing the first request based at least on the respective vulnerability score for each processing node comprises:
   determining that the respective vulnerability score for the first processing node is below a threshold value.

24. The method of claim 13 further comprising:
   determining that a new vulnerability has been added to the candidate set of one or more vulnerabilities;
   determining that a severity score associated with the new vulnerability is above a severity threshold value;
   determining a level of traffic associated with the plurality of processing nodes;
   determining a traffic threshold value based on a historical level of traffic associated with the plurality of processing nodes determining that the level of traffic associated with the plurality of processing nodes is above the traffic threshold value;
   wherein determining that the one or more criteria for applying the vulnerability-based distribution algorithm for the first request are satisfied is responsive at least to (a) determining that the severity score associated with the new vulnerability is above the severity threshold value, and (b) determining that the level of traffic associated with the plurality of processing nodes is above the traffic threshold value;
   wherein the second processing node is selected for processing the second request based on a load-based distribution algorithm;
   wherein the respective vulnerability score for each processing node is based on (a) a respective number of vulnerabilities that are detected in each processing node, and (b) respective severity scores of vulnerabilities that are detected in each processing node;
   wherein selecting the first processing node, of the plurality of processing nodes, for processing the first request based at least on the respective vulnerability score for each processing node comprises: ranking the plurality of processing nodes based on the respective vulnerability score for each processing node.

25. A system comprising:
   at least one device including a hardware processor;
   the system being configured to perform operations comprising:
      identifying a candidate set of one or more vulnerabilities associated with a plurality of processing nodes;
      analyzing each processing node, of the plurality of processing nodes, to determine a respective subset of the candidate set of one or more vulnerabilities that are detected in each processing node;
      determining, for each processing node, a respective vulnerability score based on the respective subset of vulnerabilities that are detected in each processing node;
      receiving a first request to be processed by at least one of the plurality of processing nodes;
      determining whether one or more criteria for applying a vulnerability-based distribution algorithm for the first request are satisfied;
      responsive to determining that the one or more criteria for applying the vulnerability-based distribution algorithm for the first request are satisfied:
         selecting a first processing node, of the plurality of processing nodes, for processing the first request based at least on the respective vulnerability score for each processing node;
         routing the first request to the first processing node;
      receiving a second request to be processed by at least one of the plurality of processing nodes;
      determining whether the one or more criteria for applying the vulnerability-based distribution algorithm for the second request are satisfied;
      responsive to determining that the one or more criteria for applying the vulnerability-based distribution algorithm for the second request are not satisfied:
         selecting a second processing node, of the plurality of processing nodes, for processing the second request without using the respective vulnerability score for each processing node; and
         routing the second request to the second processing node.

26. The system of claim 25, wherein:
   the operations further comprise determining that a new vulnerability has been added to the candidate set of one or more vulnerabilities; and
   determining that the one or more criteria for applying the vulnerability-based distribution algorithm for the first request are satisfied is responsive at least to determining that the new vulnerability has been added to the candidate set of one or more vulnerabilities.

27. The system of claim 26, wherein:
   the operations further comprise determining that a severity score associated with the new vulnerability is above a threshold value; and
   determining that the one or more criteria for applying the vulnerability-based distribution algorithm for the first request are satisfied is further responsive to determining that the severity score associated with the new vulnerability is above the threshold value.

28. The system of claim 25, wherein:
   the operations further comprise determining a level of traffic associated with the plurality of processing nodes; and
   determining that the one or more criteria for applying the vulnerability-based distribution algorithm for the first request are satisfied is based on the level of traffic associated with the plurality of processing nodes.

29. The system of claim 28, wherein determining that the one or more criteria for applying the vulnerability-based distribution algorithm for the first request are satisfied is responsive to determining that the level of traffic associated with the plurality of processing nodes is above a threshold value.

30. The system of claim 29, wherein the operations further comprise:
   determining the threshold value based on a historical level of traffic associated with the plurality of processing nodes.

31. The system of claim 25, wherein the second processing node is selected for processing the second request based on a load-based distribution algorithm.

32. The system of claim 25, wherein the respective vulnerability score for each processing node is based on a respective number of vulnerabilities that are detected in each processing node.

33. The system of claim 25, wherein the respective vulnerability score for each processing node is based on respective severity scores of vulnerabilities that are detected in each processing node.

34. The system of claim 25, wherein selecting the first processing node, of the plurality of processing nodes, for processing the first request based at least on the respective vulnerability score for each processing node comprises:

ranking the plurality of processing nodes based on the respective vulnerability score for each processing node.

35. The system of claim 25, wherein selecting the first processing node, of the plurality of processing nodes, for processing the first request based at least on the respective vulnerability score for each processing node comprises:
   determining that the respective vulnerability score for the first processing node is below a threshold value.

36. The system of claim 25, wherein:
   the operations further comprise:
      determining that a new vulnerability has been added to the candidate set of one or more vulnerabilities;
      determining that a severity score associated with the new vulnerability is above a severity threshold value;
      determining a level of traffic associated with the plurality of processing nodes;
      determining a traffic threshold value based on a historical level of traffic associated with the plurality of processing nodes
      determining that the level of traffic associated with the plurality of processing nodes is above the traffic threshold value;
   wherein determining that the one or more criteria for applying the vulnerability-based distribution algorithm for the first request are satisfied is responsive at least to (a) determining that the severity score associated with the new vulnerability is above the severity threshold value, and (b) determining that the level of traffic associated with the plurality of processing nodes is above the traffic threshold value;
   wherein the second processing node is selected for processing the second request based on a load-based distribution algorithm;
   wherein the respective vulnerability score for each processing node is based on (a) a respective number of vulnerabilities that are detected in each processing node, and (b) respective severity scores of vulnerabilities that are detected in each processing node;
   wherein selecting the first processing node, of the plurality of processing nodes, for processing the first request based at least on the respective vulnerability score for each processing node comprises: ranking the plurality of processing nodes based on the respective vulnerability score for each processing node.

* * * * *